United States Patent
Moorlag et al.

(10) Patent No.: US 9,052,653 B2
(45) Date of Patent: Jun. 9, 2015

(54) FUSER MEMBER COATING HAVING POLYSILSESQUIOXANE OUTER LAYER

(75) Inventors: Carolyn Moorlag, Mississauga (CA); Yu Qi, Oakville (CA); Jennifer A. Coggan, Cambridge (CA); Nan-Xing Hu, Oakville (CA)

(73) Assignee: XEROX CORPORATION, Norwalk, CT (US)

( * ) Notice: Subject to any disclaimer, the term of this patent is extended or adjusted under 35 U.S.C. 154(b) by 1092 days.

(21) Appl. No.: 12/185,886

(22) Filed: Aug. 5, 2008

(65) Prior Publication Data

US 2010/0035070 A1    Feb. 11, 2010

(51) Int. Cl.
 B32B 9/04    (2006.01)
 G03G 15/20   (2006.01)
 C08G 77/04   (2006.01)

(52) U.S. Cl.
 CPC .......... *G03G 15/2057* (2013.01); *C08G 77/045* (2013.01)

(58) Field of Classification Search
 USPC ...................................... 428/411.1
 See application file for complete search history.

(56) References Cited

U.S. PATENT DOCUMENTS

| 4,777,087 | A |   | 10/1988 | Heeks et al. |
| 5,501,881 | A |   | 3/1996  | Fuller et al. |
| 5,512,409 | A |   | 4/1996  | Henry et al. |
| 5,729,813 | A |   | 3/1998  | Eddy et al. |
| 5,945,223 | A |   | 8/1999  | Kuntz et al. |
| 6,569,932 | B2 | * | 5/2003  | Hsiao et al. ............... 524/269 |
| 7,050,743 | B2 |   | 5/2006  | Blair et al. |
| 7,127,205 | B2 |   | 10/2006 | Gervasi et al. |
| 7,193,015 | B1 | * | 3/2007  | Mabry et al. ................ 525/101 |
| 2005/0090015 | A1 | * | 4/2005  | Hartmann-Thompson ... 436/166 |
| 2005/0173780 | A1 | * | 8/2005  | Sethumadhavan et al. ... 257/632 |
| 2006/0263536 | A1 | * | 11/2006 | Blair et al. ............ 427/421.1 |
| 2008/0277724 | A1 | * | 11/2008 | Qi et al. ................. 257/347 |

FOREIGN PATENT DOCUMENTS

JP    2007015977 A  *  1/2007

OTHER PUBLICATIONS

Iacono et al., Synthesis, Characterization, and Surface Morphology of Pendant Polyhedral Oligomeric Silsesquioxane Perfluorocyclobutyl Aryl Ether Copolymers, 2007, Macromolecules, vol. 40, pp. 9517-9522.*

* cited by examiner

*Primary Examiner* — Callie Shosho
*Assistant Examiner* — Patrick English
(74) *Attorney, Agent, or Firm* — MH2 Technology Law Group LLP

(57) ABSTRACT

A fuser member comprising a substrate, and thereover, an outer layer comprising polysilsesquioxane additives, and an image forming apparatus containing the fuser member therein.

13 Claims, 2 Drawing Sheets

FUSER MEMBER COATING HAVING POLYSILSESQUIOXANE OUTER LAYER

BACKGROUND

The disclosed embodiments generally relate to the field of xerographic or electrophotographic apparatuses, including printers and copiers. The embodiments included herein relate to fuser members, and more particularly, fuser members having outer coatings, and preparation thereof. The outer coatings herein comprise polysilsesquioxane, and in embodiments, an outer layer having a fluoropolymer with polysilsesquioxane dispersed, anchored or bonded therein.

In a typical electrostatographic printing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support which may be a photosensitive member itself or other support sheet such as plain paper.

The use of thermal energy for fixing toner images onto a support member is well known. In order to fuse electroscopic toner material onto a support surface permanently by heat, it is necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Typically, thermoplastic resin particles are fused to the substrate by heating to a temperature of between about 90° C. to about 160° C. or higher depending upon the softening range of the particular resin used in the toner. It is not desirable, however, to raise the temperature of the substrate substantially higher than about 200° C. because of the tendency of the substrate to discolor at such elevated temperatures, particularly when the substrate is paper.

Several approaches to thermal fusing of electroscopic toner images have been described in the prior art. These methods include providing the application of heat and pressure substantially concurrently by various means: a roll pair maintained in pressure contact; a belt member in pressure contact with a roll; and the like. Heat may be applied by heating one or both of the rolls, plate members or belt members. The fusing of the toner particles takes place when the proper combination of heat, pressure and contact time is provided. The balancing of these parameters to bring about the fusing of the toner particles is well known in the art, and they can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip affect the fusing of the toner image onto the support. It is desired in the fusing process that no offset of the toner particles from the support to the fuser member take place during normal operations. Toner particles that offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquefy and a splitting of the molten toner takes place during the fusing operation with a portion remaining on the fuser member. The hot offset temperature or degradation to the hot offset temperature is a measure of the release property of the fuser roll, and accordingly it is desired to provide a fusing surface, which has a low surfaced energy to provide the necessary release. To ensure and maintain good release properties of the fuser roll, it has become customary to apply release agents to the fuser roll during the fusing operation. Typically, these materials are applied as thin films of, for example, silicone oils to prevent toner offset.

One the earliest and successful fusing systems involved the use of silicone elastomer fusing surfaces, such as a roll with a silicone oil release agent which could be delivered to the fuser roll by a silicone elastomer donor roll. The silicone elastomers and silicone oil release agents used in such systems are described in numerous patents and fairly collectively illustrated in U.S. Pat. No. 4,777,087 to Heeks, which is incorporated herein in its entirety.

While highly successful in providing a fusing surface with a very low surface energy to provide excellent release properties to ensure that the toner is completely released from the fuser roll during the fusing operation, these systems suffer from a significant deterioration in physical properties over time in a fusing environment. In particular, the silicone oil release agent tends to penetrate the surface of the silicone elastomer fuser members resulting in swelling of the body of the elastomer causing major mechanical failure including debonding of the elastomer from the substrate, softening and reduced toughness of the elastomer causing it to chunk out and crumble, contaminating the machine and providing non-uniform delivery of release agent. Furthermore, as described in U.S. Pat. No. 4,777,087, additional deterioration of physical properties of silicone elastomers results from the oxidative crosslinking, particularly of a fuser roll at elevated temperatures.

Fuser and fixing rolls or belts may be prepared by applying one or more layers to a suitable substrate. Cylindrical fuser and fixer rolls, for example, may be prepared by applying an elastomer or fluoroelastomer to an aluminum cylinder. The coated roll is heated to cure the elastomer. Such processing is disclosed, for example, in U.S. Pat. Nos. 5,501,881; 5,512,409; and 5,729,813; the disclosure of each of which is incorporated by reference herein in their entirety.

U.S. Pat. No. 7,127,205, which is hereby incorporated by reference in its entirety, provides a process for providing an elastomer surface on a fusing system member. Generally, the process includes forming a solvent solution/dispersion by mixing a fluoroelastomer dissolved in a solvent such as methyl ethyl ketone and methyl isobutyl ketone, a dehydrofluorinating agent such as a base, for example the basic metal oxides, MgO and/or $Ca(OH)_2$, and a nucleophilic curing agent such as VC-50 which incorporates an accelerator and a crosslinking agent, and coating the solvent solution/dispersion onto the substrate. Commonly used fluoropolymer crosslinkers are bisphenol-A and bisphenol AF that are known to react with unsaturated positions on fluoropolymer chains. The surface is then stepwise heat cured. Prior to the stepwise heat curing, ball milling is usually performed for from 2 to 24 hours.

A more mechanically robust coating is required for new generation fusing systems in order to improve lifetime and diminish the occurrence of roll failure due to edge wear. Higher thermal conductivity of the top layer would improve heat retention at the surface during fusing, and electrical conductivity would dissipate any static charge buildup.

Known fuser coatings include crosslinked fluoropolymers such as VITON-GF® (DuPont) used in conjunction with a release fluid, or perfluoroalkoxy polymer resin (PFA) used in oil-free or low oil applications. While these polymers have desirable properties such as thermal and chemical stability, and low surface-energy, fuser rolls continue to fail at shorter times than is desirable, primarily due to edge wear and poor release at the surface (offset).

To reduce wear, modulus and harness are normally increased by the addition of reinforcers such as carbon black or metal oxides that may introduce surface defects. However, an improvement in mechanical properties can be brought about by the incorporation of polysilsesquioxane particles. Addition of these particles, in embodiments, increases durability, without compromising the homogeneity of the material.

SUMMARY

Embodiments include a fuser member comprising a substrate, and thereover, an outer layer comprising polysilsesquioxanes dispersed in a polymer comprising polymer chains.

Embodiments further include a fuser member comprising a substrate, and thereover, an outer layer comprising a crosslinked polymer matrix comprising a fluoroelastomer having polyhedral oligomeric silsesquioxanes dispersed and covalently bonded within the crosslinked polymer matrix, wherein the polyhedral oligomeric silsesquioxanes have the following Formula II:

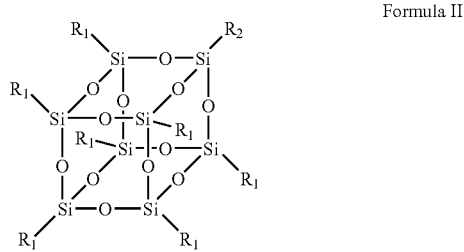

Formula II wherein $R_1$ is a functional group selected from the group consisting of substituted alkyl group having from about 1 to about 20 carbons, unsubstituted alkyl group having from about 1 to about 20 carbons, a substituted aryl group having from about 4 to about 10 carbons, an unsubstituted aryl group having from about 4 to about 10 carbons, a fluorinated alkyl group having from about 1 to about 20 carbons, and a fluorinated aryl group having from about 4 to about 10 carbons, and $R_2$ is a functional crosslinking group selected from the group consisting an amino group, a hydroxyphenyl group and a siloxane group.

In addition, embodiments include an image forming apparatus for forming images on a recording medium comprising a charge-retentive surface to receive an electrostatic latent image thereon; a development component to apply toner to the charge-retentive surface to develop an electrostatic latent image to form a developed image on the charge-retentive surface; a transfer component to transfer the developed image from the charge retentive surface to a copy substrate; and a fuser member for fusing toner images to a surface of the copy substrate, wherein the fuser member comprises a substrate, and thereover, an outer layer comprising polysilsesquioxane additives.

BRIEF DESCRIPTION OF THE DRAWINGS

The above embodiments will become apparent as the following description proceeds upon reference to the drawings, which include the following figures.

DETAILED DESCRIPTION

Herein are described embodiments of a fuser member coating comprising a polysilsesquioxane additive. In embodiments, the coating comprises oligomeric silsesquioxane, or polyhedral oligmeric silsesquioxane (POSS). In embodiments, the polysilsesquioxane particles are nanosize. In embodiments, the additive is dispersed in, or anchored, or bonded to the outer coating. In other embodiments, the material is physically doped or chemically anchored into a polymer matrix. In embodiments, the polymer matrix is a fluorocarbon or fluoropolymer material. In other embodiments, the additive may contain other functional groups.

The addition of polysilsesquioxane, in embodiments, provides an increase in modulus and/or toughness of the outer layer, and improves the outer layer durability, resulting in increased life of the fuser member, without compromising the homogeneity of the material. In embodiments, the polysilsesquioxane particles are nanosized, and the small size produces a uniform coating that limits surface defects through reactive groups or curing agents. Adding fluorinated groups to the polysilsesquioxane additives results, in embodiments, in a compatible particle-shell complex to evenly distribute particles throughout the fluoropolymer matrix. Release is also enhanced, in embodiments, by addition of functionalized polysilsesquioxane particles. Polysilsesquioxane particles functionalized with, for example, siloxane groups, in embodiments, enhances release in fusing systems where polydimethylsiloxane fuser release fluids are applied to the topcoat surface. Alternatively, for low-oil fusing systems, polysilsesquioxane particles functionalized with fluorinated groups would enhance oil-less release. In other embodiments, polysilsesquioxane particles may be functionalized with groups that crosslink to fluoropolymer chains, and therefore, fixing the polysilsesquioxane particles within the matrix and/or crosslinking the fluoropolymer.

More specifically, the silica-like polysilsesquioxane particles are relatively hard and heat resistant, and therefore, tend to increase the modulus, hardness and thermal stability of the outer fuser layer. Accordingly, in embodiments, the durability of the fuser roller is increased. In addition, the polysilsesquioxane nanoparticles have silicone-like character similar to the polydimethylsiloxane (PDMS) fuser fluid used in known fusing systems, such as, for example, iGen machines. The polysilsesquioxane may be functionalized with side groups. Functionalization of polysilsesquioxane allows the flexibility to solubilize polysilsesquioxane for processing and improving compatibility with host systems such as polymers, for example, fluoropolymers or specialized fluoropolymers such as fluoroelastomers. A variety of polysilsesquioxane particles are available through Aldrich, Gelest, and other companies.

Figure 1:
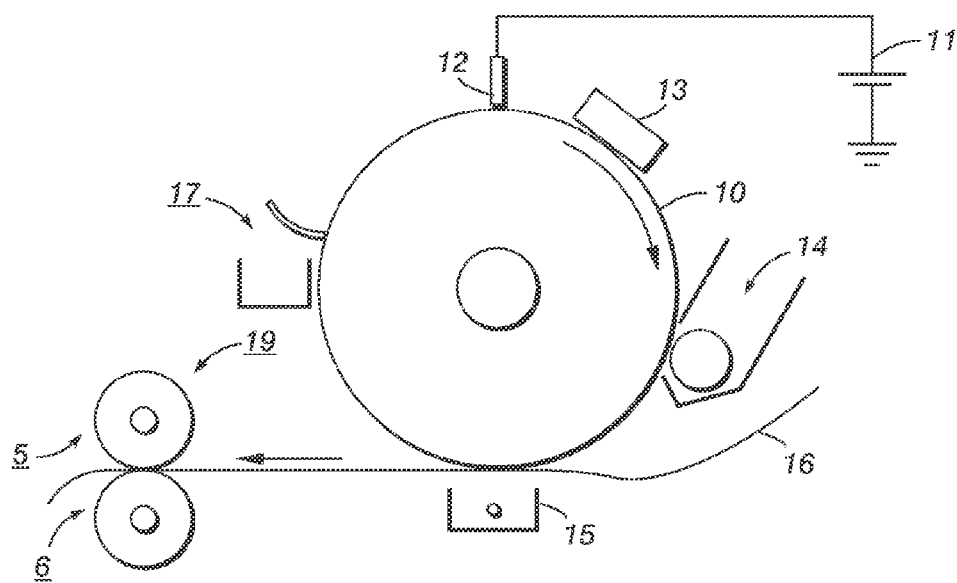
FIG. 1 is an illustration of a general electrostatographic apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 5 and pressure member 6, thereby forming a permanent image. Photoreceptor 10, subsequent to transfer, advances to cleaning station 17, wherein any toner left on photoreceptor 10 is cleaned therefrom by use of a blade (as shown in FIG. 1), brush, or other cleaning apparatus.

Figure 2:
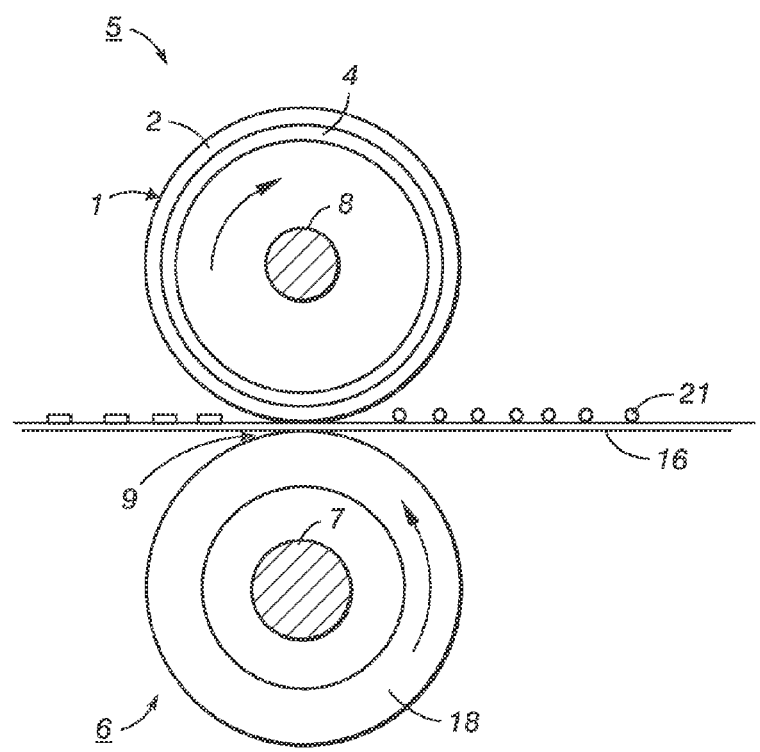
FIG. 2 is a sectional view of a fusing assembly in accordance with one embodiment disclosed herein.

In FIG. 2, fuser roller 5 can be a hollow cylinder or core fabricated from any suitable metal, such as aluminum, anodized aluminum, steel, nickel, copper, and the like, having a suitable heating element 8 disposed in the hollow portion thereof which is coextensive with the cylinder.

Backup or pressure roll 6 cooperates with fuser roll 5 to form a nip or contact arc 9 through which a copy paper or other substrate 16 passes such that toner images 21 thereon contact surface 2 of fuser roll 5. As shown in FIG. 2, the backup roll 6 has a rigid steel core 7 with a surface or layer 18 thereon.

The fusing component can be comprised of at least three different configurations. In one embodiment, the fusing component is of a two-layer configuration as shown in FIG. 2. Fuser member 5 having heating element 8, comprises substrate 4. Positioned over the substrate 4 is outer layer 2. A release fluid can be positioned on the surface 1 of outer layer 2.

Figure 3:
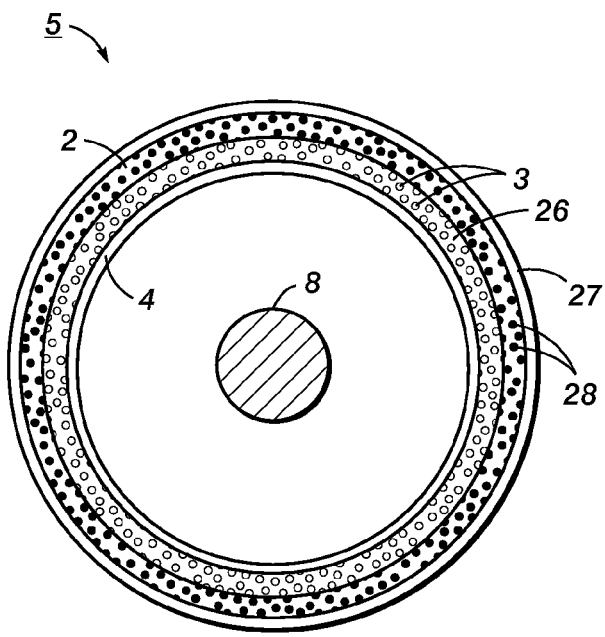
FIG. 3 is a sectional view of a fuser roller having a three-layer configuration.

FIG. 3 demonstrates a three-layer configuration, wherein fuser roller 5 has heating member 8 inside, and thereover substrate 4 and having intermediate layer 26 positioned on substrate 4, and outer layer 2 positioned on intermediate layer 26. FIG. 3 demonstrates optional fillers 3 and 28, which may be the same or different, and can be dispersed optionally in the intermediate layer 26, and/or optionally in the outer layer 2. There may be provided none, one, or more than one type of filler(s) in the layer(s).

In embodiments, there may be present an outer release layer 27 positioned on the outer layer 2 as shown in FIG. 3. In embodiments, this is a liquid release fluid layer, comprising, for example, a polydimethylsiloxane release agent, which may or may not have functionality such as, for example, amino functionality, hydride functionality, mercapto functionality, or the like.

Examples of suitable substrate materials include, in the case of roller substrate, metals such as aluminum, stainless steel, steel, nickel and the like. In the case of film-type substrates (in the event the substrate is a fuser belt, film, drelt (a cross between a drum and a belt) or the like) suitable substrates include high temperature plastics that are suitable for allowing a high operating temperature (i.e., greater than about 80° C., or greater than 200° C.), and capable of exhibiting high mechanical strength.

In embodiments, the polysilsesquioxane is an oligomer and is composed of linear or branched chains of silicon-oxygen bonds. The silicon atoms along the polysilsesquioxane oligomers are substituted with functional groups. For example, hydrogen, fluorine, alkyl, aryl or fluorocarbon functional groups. The choice of functional group affects the properties of polysilsesquioxane additive.

Figure 4:
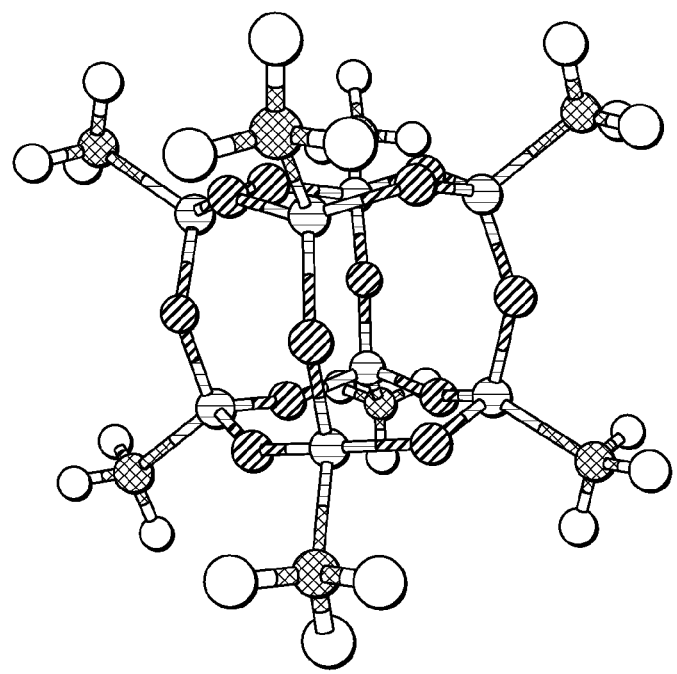
FIG. 4 is a depiction of the molecular structure of an embodiment of $Si_8O_{12}$ functionalized with 8 methyl groups.

In embodiments, the silsesquioxane is polyhedral in shape and is oligomeric, and is termed polyhedral oligomeric silsesquioxane (POSS). POSS comprises a silicon-oxygen cage as a core, and said core is relatively stiff. Polyhedral shapes of POSS include octagonal (T8), decagonal (T10), and (T12) cages, with the T8 structure most commonly formed. An illustrated example of an octagonal (T8) POSS is shown in FIG. 4. The formation of different frameworks of POSS structures is controlled by factors in preparation such as pH, temperature, solvent, and hydrolysis method. POSS are discrete molecules exhibiting properties of both silica and silicone, and can be described as nanosized particles having a particle size of from about 0.5 nm to about 5 nm, or from about 1 nm to about 2 nm.

Octahedral (T8) POSS has the general formula $Si_8O_{12}$ and the basic general polyhedral structure as shown in Formula 1 below:

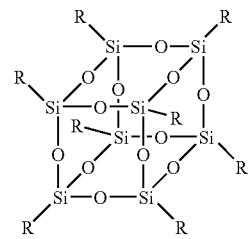

wherein R is a functional group selected from the group consisting of hydrogen, substituted or unsubstituted alkyl group having from about 1 to about 20 carbons, or from about 1 to about 10 carbons, such as methyl, ethyl, propyl, butyl, tertbutyl, isobutyl, and the like; a substituted or unsubstituted aryl group having from about 4 to about 10 carbons, or from about 5 to about 8 carbons, with the most common example being phenyl; a fluorinated alkyl group having from about 1 to about 20 carbons, or from about 1 to about 10 carbons, a fluorinated aryl group having from about 4 to about 10 carbons, or from about 5 to about 8 carbons; a substituted or unsubstituted siloxy group having from about 1 to about 10 silicon atoms, such as siloxy, bisiloxy, and trisiloxy; an amino group having from about 1 to about 10 carbons, a hydroxyphenyl group having from about 6 to about 24 carbons; and mixtures thereof, wherein substituted groups can be amino groups, halogen groups (such as chlorine, bromine, fluorine, and the like), hydroxyl groups, or other groups.

In embodiments, functional groups are chosen to cap the POSS particles to enhance compatibility of POSS to the polymer matrix (the polymer coating), such as fluoropolymer polymer matrix chains. Examples of side groups set forth above as R groups in Formula I are alkyl, aryl, fluoroalkyl, and fluoroaryl groups.

In embodiments, functional groups capping POSS cages are different and are represented by the following Formula II:

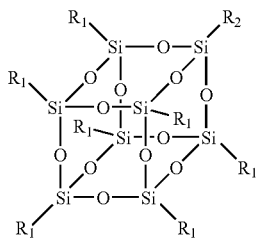

wherein $R_1$ is a non-reactive functional group, such as a substituted or unsubstituted alkyl having from about 1 to about 20 carbons, or from about 1 to about 10 carbons, substituted or unsubstituted aryl having from about 4 to about 10 carbons, or from about 5 to about 8 carbons, fluorinated alkyl having from about 1 to about 20 carbons, or from about 1 to about 10 carbons, or fluorinated aryl group having from about 4 to about 10 carbons, or from about 5 to about 8 carbons; and $R_2$ is a functional crosslinking group. POSS with Formula II is normally formed from silanols that are incompletely condensed POSS frameworks missing one functionality-capped Si corner group. Silanols are normally reacted with trialkoxysilane or trihalosilane to form POSS with Formula II.

In embodiments, $R_1$ of Formula II is a fluorinated group selected from a group consisting of a linear fluorinated alkyl chain with the formula $F_3C(F_2C)_n(CH_2)_m$—, wherein n is a number of 0 to about 17, or 0 to about 10, and m is a number of 0 to about 4; a branched fluorinated alkyl chain having the formula $(F_3C)_2(CH)(F_2C)_n(CH_2)_m$, wherein n is a number of 0 to about 15, or from about 1 to about 10, and m is a number of 0 to about 4; a linear perfluoroether chain with the formula $F_3C(F_2C)_n(CH_2)_mO_q$, wherein n is a number of 0 to about 17, or 0 to about 10, and m is a number of 0 to about 4, and q is a number of 1 to about 10, or 1 to about 3; a branched perfluoroether chain with the formula $(F_3C)_2(CH)(F_2C)_n(CH_2)_mO_q$, wherein n is a number of 0 to about 17, or 0 to about 10, and m is a number of 0 to about 4, and q is a number of 1 to about 10, or 1 to about 3; and a fluorinated aryl group with the formula $C_nF_{n-1}$, wherein n is a number of 5 to about 10. Examples of fluorinated alkyl and aryl groups include the following:

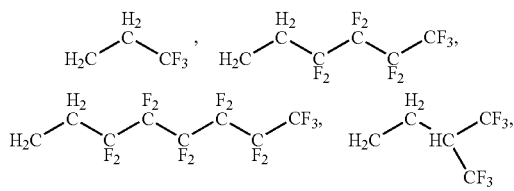

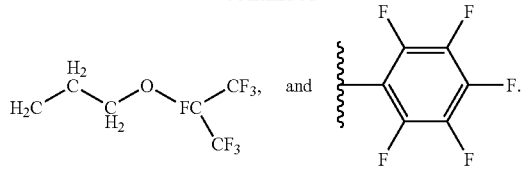

In embodiments, $R_2$ of Formula II comprises a functional crosslinking group capable of covalently bonding to one or more polymer chains of a polymer matrix, or may be covalently bonded to one or more functional groups that are covalently attached to polymer chains. Examples include, but are not limited to, functional groups comprising one or more of an amino group with the formula $C_nH_{2n}NH_2$ or $C_nH_{2n}NHCH_2CH_2NH_2$, wherein n is a number of 0 to about 10, or from about 2 to about 6; a siloxane group with a formula of $C_nH_{2n}SiX_3$, wherein n is a number of 0 to about 10, or from about 2 to about 6, and X is a halo or alkoxy group; and hydroxyphenyl groups such as bifunctional crosslinking groups with the formula $(OH)(C_nH_{2n})C_6H_3C(CX_3)_2C_6H_3(C_nH_{2n})(OH)$, wherein n is a number of 0 to about 10, or 2 to about 6, and X is H or F. A specific example of the said functional crosslinking groups may be selected from the group consisting of the following:

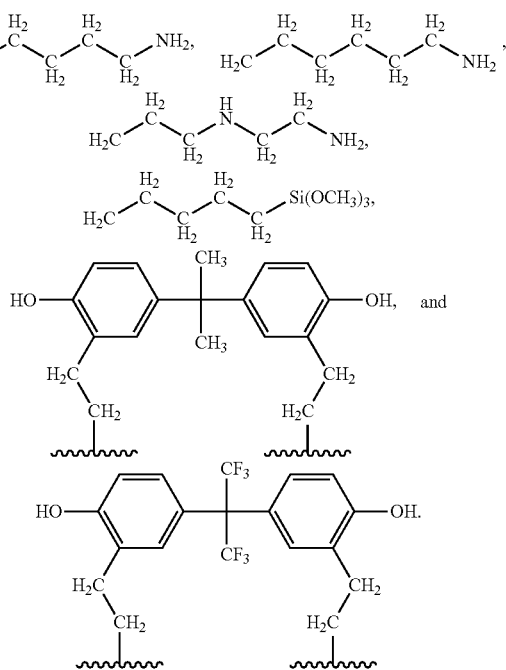

Commercially available examples of Formula II with corner capping of reactive functional groups include heptaisobutyl(3-(2-aminoethyl)amino)propyl-PSS (Formula A) from Aldrich, wherein the amino functional group of A can be bound to a fluoropolymer matrix. Commercially available precursors to Formula II include (3-chloropropyl)-heptacyclopentyl-PSS (Formula B1), chloropropyl-heptaisobutyl-PSS (Formula B2), (4-chlorobenzyl)-heptacyclopentyl-PSS (Formula C), and hydrido-heptacyclopentyl-PSS (Formula D) from Aldrich, wherein the chloro-functional groups of B1, B2, and C can be functionalized to amino, siloxyl, or hydroxyphenyl crosslinking groups. The hydrido functionality of D can be crosslinked by hydrosilation reactions. Therefore, vinyl-functionalized crosslinking groups such as vinyl-substituted bisphenol A (BPA) may be directly linked to the POSS molecule to give the proposed material Formula E below. Since E is multifunctional, this type of material may also be used to crosslink fluoropolymer chains while incorporating POSS into the polymer matrix. Such POSS particles and the like then serve, in embodiments, as multiple purposes as crosslinker, reinforcer, and release agent.

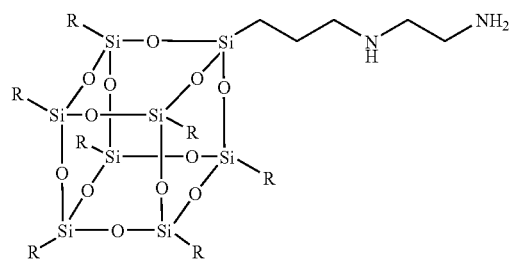

A

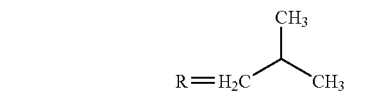

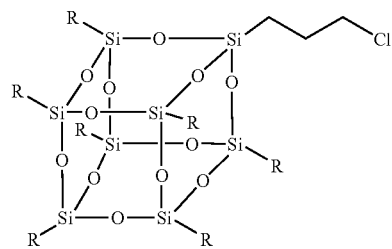

B

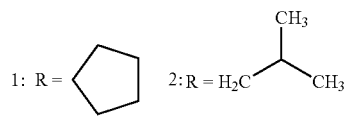

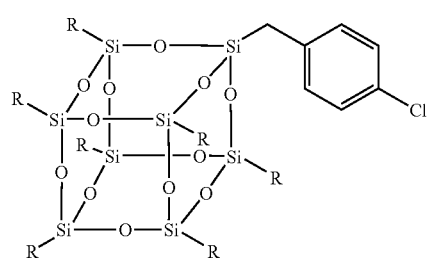

C

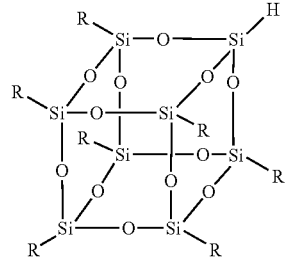

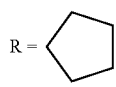

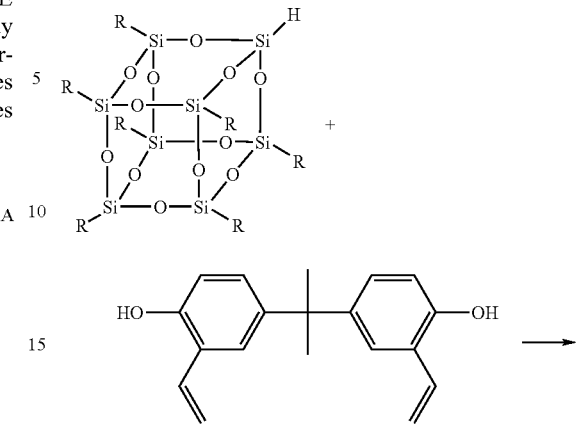

D

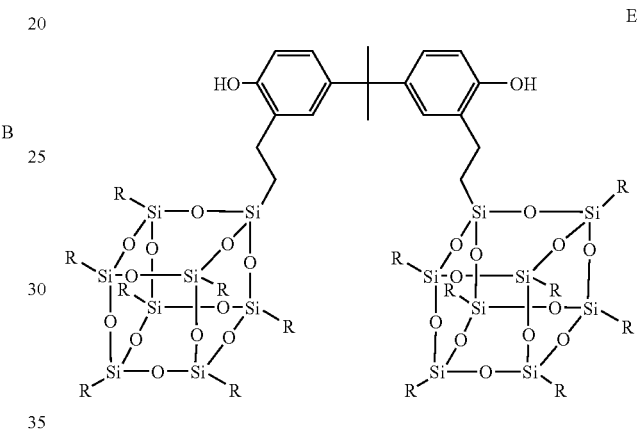

E

Addition of fluorinated chains to the cores of POSS can be carried out by acid- or base-catalyzed hydrolysis of commercially available silyl precursors such as trialkoxysilanes or trichlorosilanes that are functionalized with fluorinated chains, followed by condensation to form silsesquioxane cages. A proposed synthetic scheme is shown below, prepared from fluoroalkyltrichlorosilane precursor.

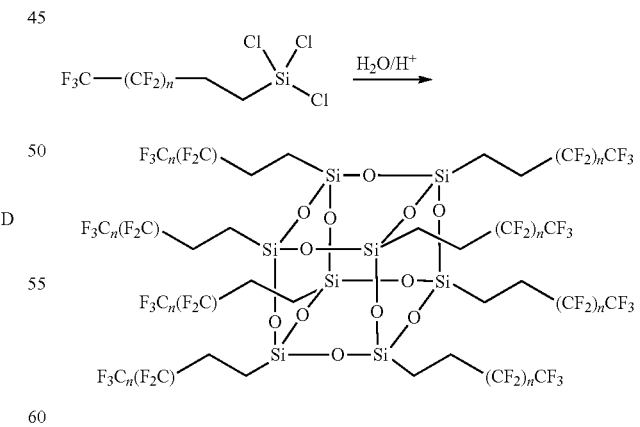

Advantages of fluorinated POSS particles are that they are relatively dense compared to other substituted POSS particles, and provide, in embodiments, additional robustness to a reinforced fluoropolymer layer. Fluorinated POSS also display very low surface energy that aids in the creation of a non-stick surface. This, in turn, decreases the wetting of fuser fluid and improves release, in embodiments.

Fluorinated POSS containing crosslinking groups can be accomplished by the synthesis of incompletely condensed fluorinated POSS containing active sites for functionalization, followed by the incorporation of functional groups, such as, for example, silyl amine groups, silyl phenol groups, or another group such as those set forth as $R_2$ in Formula II above, that bind to polymer chains. This procedure fixes fluorinated POSS nanoparticles within the fluoropolymer matrix. The incorporation of multiple crosslinking functionalities allows the additional use of fluorinated POSS materials as fluoropolymer crosslinkers. In embodiments, POSS nanoparticles are functionalized with fluoropolymer binding groups, in order to fix POSS nanoparticles via covalent bonding within the polymer matrix and/or crosslink fluoropolymer chains. Below is a schematic illustration of a fluorinated POSS functionalized with an amine crosslinking group.

A®, VITON B®, VITON E®, VITON F®, VITON E60C®, VITON E45®, VITON E430®, VITON B 910®, VITON GH®, VITON B50®, VITON E45®, and VITON GF®. The VITON® designation is a Trademark of E.I. DuPont de Nemours, Inc. Three known fluoroelastomers are (1) a class of copolymers of two of vinylidenefluoride, hexafluoropropylene and tetrafluoroethylene, known commercially as VITON A®, (2) a class of terpolymers of vinylidenefluoride, hexafluoropropylene and tetrafluoroethylene known commercially as VITON B®, and (3) a class of tetrapolymers of vinylidenefluoride, hexafluoropropylene, tetrafluoroethylene and a cure site monomer, for example, VITON® GF, VITON A®, and VITON B®. The cure site monomer can be 4-bromoperfluorobutene-1, 1,1-dihydro-4-bromoperfluorobutene-1, 3-bromoperfluoropropene-1, 1,1-dihydro-3-bromoperfluoropropene-1, or any other suitable, known cure site monomer.

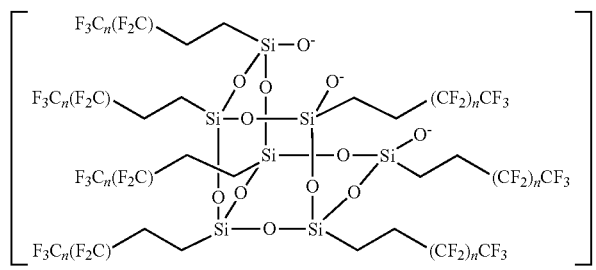

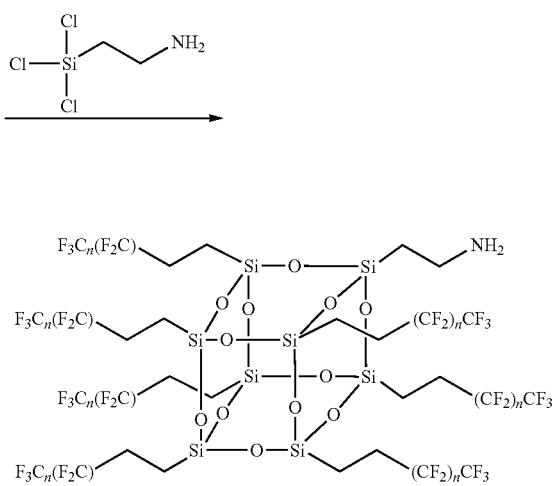

Examples of crosslinking agents include a biphenol such as hydroquinone, a bisphenol such as bisphenol A (2,2-bis(4-hydroxyphenyl)propane) or bisphenol AF (2,2-bis(4-hydroxyphenyl)hexafluoropropane, in commercial formulations such as VC50 from Dupont), an aminosilane such as AO700 (aminoethyl aminopropyl trimethoxysilane crosslinker from Gelest), a diamine such as hexamethylenediamine, and a masked diamine such as N,N'-dicinnamylidene-1,6-hexanediamine. A "masked" diamine refers to the coordination of functional groups to amine functionalities. In embodiments, a fluoropolymer is dissolved in a solvent and a crosslinking agent is added along with other components that enable crosslinking.

POSS may be dispersed or contained into a polymer matrix in an amount of from about 0.1 to about 30, or from about 1 to about 10 percent by weight of total solids in the polymer and POSS formulation. Polysilsesquioxane can be nanoparticle size of from about 0.5 to about 5 nm, or from about 1 to about 2 nm.

Examples of suitable host polymers for the outer coating include fluoropolymers, fluorocarbons, fluoroelastomers, and the like. Examples of fluoroelastomers include ethylenically unsaturated fluoroelastomers, and fluoroelastomers comprising copolymers and terpolymers of vinylidenefluoride, hexafluoropropylene and tetrafluoroethylene, which are known commercially under various designations as VITON The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene with about 2 weight percent cure site monomer.

Other commercially available fluoropolymers include FLUOREL 2170®, FLUOREL 2174®, FLUOREL 2176®, FLUOREL 2177® and FLUOREL LVS 76®, FLUOREL® being a Trademark of 3M Company. Additional commercially available materials include AFLAS™ a poly(propylene-tetrafluoroethylene) and FLUOREL II® (LII900) a poly (propylene-tetrafluoroethylenevinylidenefluoride) both also available from 3M Company, as well as the Tecnoflons identified as FOR-60KIR®, FOR-LHF®, NM® FOR-THF®, FOR-TFS®, TH®, and TN505®, available from Montedison Specialty Chemical Company.

Examples of other fluoropolymers include fluoroplastics or fluoropolymers such as polytetrafluoroethylene, fluorinated ethylene propylene resin, perfluoroalkoxy, and other TEFLON®-like materials, and polymers thereof.

Below is a schematic illustration of POSS acting as a crosslinker across fluoropolymer chains:

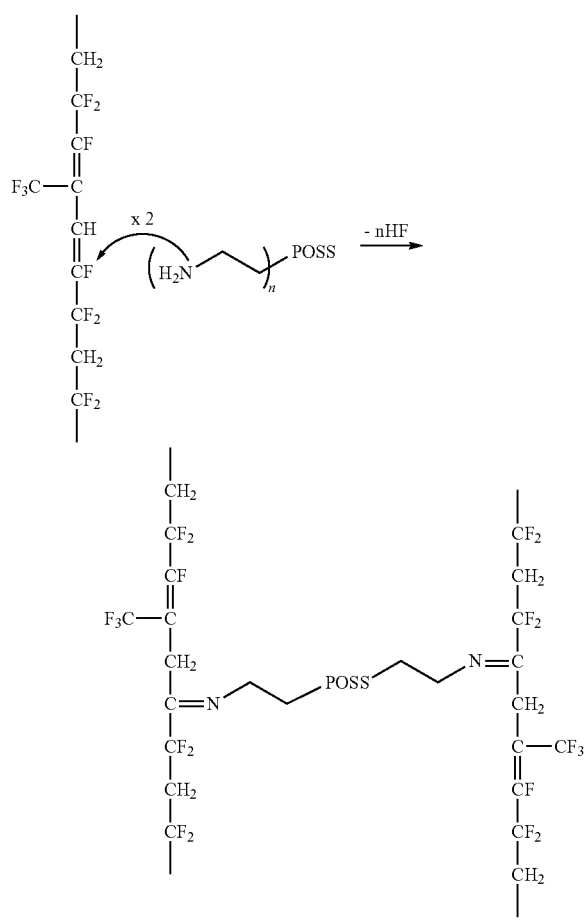

The outer material composition can be coated on a substrate in any suitable known manner. Typical techniques for coating such materials on the reinforcing member include liquid and dry powder spray coating, dip coating, wire wound rod coating, fluidized bed coating, powder coating, electrostatic spraying, sonic spraying, blade coating, and the like. In an embodiment, the aliphatic-aromatic fluoropolymer material coating is spray or flow coated to the substrate. Details of the flow coating procedure can be found in U.S. Pat. No. 5,945,223, the disclosure of which is hereby incorporated by reference in its entirety.

Heating the fluoropolymer coating may be a step curing cycle where the temperature and heating time at temperature are varied; these curing cycles for fluoroelastomers are known by persons of ordinary skill in the art. The outer layer is heat treated by stepwise heat treatment to a temperature of from about 170° C. to about 250° C., or from about 200° C. to about 240° C., or from about 218° C. to about 232° C.

In an embodiment, the outer layer may be modified by any known technique such as sanding, polishing, grinding, blasting, coating, or the like. In embodiments, the outer fluoropolymer layer has a surface roughness of from about 0.02 to about 1.5 micrometers, or from about 0.3 to about 0.8 micrometers.

The thickness of the outer polymeric surface layer of the fuser member herein is from about 10 to about 100 micrometers, or from about 15 to about 40 micrometers.

Optional intermediate adhesive layers and/or intermediate polymer or elastomer layers may be applied to achieve desired properties and performance objectives. The intermediate layer may be present between the substrate and the outer polymeric surface. Examples of suitable intermediate layers include silicone rubbers such as room temperature vulcanization (RTV) silicone rubbers; high temperature vulcanization (HTV) silicone rubbers and low temperature vulcanization (LTV) silicone rubbers. These rubbers are known and readily available commercially such as SILASTIC® 735 black RTV and SILASTIC® 732 RTV, both from Dow Corning; and 106 RTV Silicone Rubber and 90 RTV Silicone Rubber, both from General Electric. Other suitable silicone materials include the siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182. An adhesive intermediate layer may be selected from, for example, epoxy resins and polysiloxanes.

There may be provided an adhesive layer between the substrate and the intermediate layer. There may also be an adhesive layer between the intermediate layer and the outer layer. In the absence of an intermediate layer, the polymeric outer layer may be bonded to the substrate via an adhesive layer.

The thickness of the intermediate layer is from about 0.5 to about 20 mm, or from about 1 to about 5 mm.

Release agents or fusing oils may be provided onto the outer layer of the fuser member via a delivery mechanism such as a delivery roll. The delivery roll is partially immersed in a sump, which houses the fuser oil or release agent. The release oil is renewable in that the release oil is housed in a holding sump and provided to the fuser roll when needed, optionally by way of a release agent donor roll in an amount of from about 0.1 to about 20 mg/copy, or from about 1 to about 12 mg/copy. The system by which fuser oil is provided to the fuser roll via a holding sump and optional donor roll is well known. The release oil may be present on the fuser member in a continuous or semicontinuous phase. The fuser oil in the form of a film is in a continuous phase and continuously covers the fuser member. Examples of suitable fuser oils include mercapto-functional, amino-functional, hydride functional, and other functional and non-functional polydialkylsiloxe fuser oils.

The substrate may be in the form of a roller, belt, drelt (cross between a drum and a belt), film, sheet, or the like. If the substrate is in the form of a roller, the roll comprises a metal core, wherein the metal is stainless steel, aluminum, or the like.

The following Examples further define and describe embodiments herein. Unless otherwise indicated, all parts and percentages are by weight.

EXAMPLES

Example 1

Fluoroalkyl-Substituted Polyhedral Oligomeric Silsesquioxane (POSS) Dispersed in Fluoropolymer In one application, 25 g of trifluoropropyltrimethoxysilane were added to 600 mL of methanol, and 35 mL of concentrated hydrochloric acid were subsequently added. The solution was stirred for 2 hours, then left to sit for 1 month during which time crystals were formed. The crystals were recovered by filtration, washed with methanol and dried under reduced pressure.

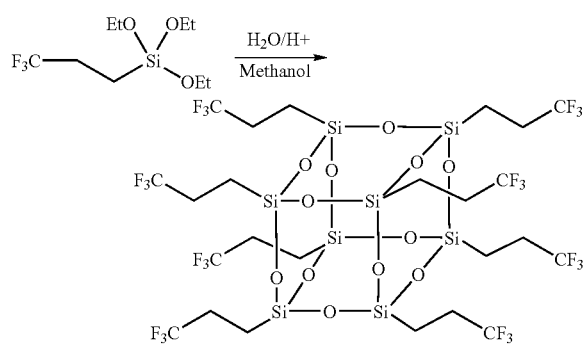

A white powder was obtained, and the structure of the resulting fluoroalkyl-substituted POSS was confirmed by $^1$H, $^{13}$C, and $^{19}$F NMR. Example fluoropolymer composite coating formulations were prepared first by mixing 41 g of Viton GF with 200 g of methyl isobutyl ketone for 18 hours. Fluoroalkyl-substituted POSS was added to the coating formulations in selected ratios of parts per hundred (pph) compared to the weight of fluoropolymer in the formulation (for example, but not limited to, 5 pph and 20 pph). Prior to coating, a designated amount (for example, but not limited to, about 0.5 parts per hundred (pph)) of a curing agent mixture including magnesium oxide, calcium hydroxide, and VC-50 (Viton® Curative No. 50 available from E. I. du Pont de Nemours, Inc.) pre-mixed in methyl isobutyl ketone is added to the coating solution. The resulted dispersions (suspensions) were then coated onto a suitable substrate for analysis. The coatings was allowed to evaporate most of the solvent, followed by curing at about 170° C. for 2 hours and additional 6 hours at about 200° C. The thickness of the composite coatings was about 25 microns after curing.

Example 2

Characterization of POSS-Fluoropolymer Composites

Heat-treated composite coatings were tested for crosslinking efficiency by a procedure whereby a coating sample (~0.5 g) was soaked in 20 mL of methyl ethyl ketone for approximately 24 hours, and weight of the extracted material was subsequently determined. Weight percent MEK extractables were found to be between 1 to 5% for the 5 pph and 20 pph fluoroalkyl-substituted POSS compositions, within an acceptable range for fusing materials. Mechanical properties measured using an Instron mechanical tester were found to be modified by the addition of fluoroalkyl-substituted POSS compared to a VITON® formulation excluding POSS. Notably, for a 5 pph composition, there was a 40% increase in tensile stress; and at higher loading of 20 pph, there was a 55% increase in tensile strength, a 133% increase in initial modulus, and a 100% increase in toughness (Table I).

TABLE I

Mechanical Properties of POSS-Fluoropolymer Composites

| Filler Level | Stress at Break (psi) | Strain at Break (psi) | Initial Modulus (psi) | Toughness (in lbf/in) |
|---|---|---|---|---|
| 0 | 590 | 177 | 495 | 600 |
| 5 | 825 | 167 | 561 | 697 |
| 20 | 615 | 275 | 1155 | 1174 |

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims. The patents discussed herein are incorporated by reference in their entirety.

What is claimed:

1. A fuser member comprising a substrate, and thereover, an outer layer comprising polysilsesquioxane dispersed in a fluoroelastomer comprising polymer chains,
wherein said polysilsesquioxane are present in an amount ranging from about 0.1 percent to about 30 percent by weight of total solids of the outer layer;
wherein said fluoroelastomer is selected from the group consisting of (1) a class of copolymers of two of vinylidenefluoride, hexafluoropropylene and tetrafluoroethylene, (2) a class of terpolymers of vinylidenefluoride, hexafluoropropylene and tetrafluoroethylene, and (3) a class of tetrapolymers of vinylidenefluoride, hexafluoropropylene, tetrafluoroethylene and a cure site monomer;
wherein said polysilsesquioxane are fixed in the fluoroelastomer by reacting the polymer chains with compounds of Formula II:

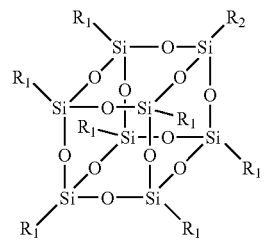

wherein $R_1$ is a functional group selected from the group consisting of substituted alkyl group having from about 1 to about 20 carbons; unsubstituted alkyl group having from about 1 to about 20 carbons; a substituted aryl group having from about 4 to about 10 carbons; an unsubstituted aryl group having from about 4 to about 10 carbons; a fluorinated alkyl group having from about 1 to about 20 carbons, and a fluorinated aryl group having from about 4 to about 10 carbons; and $R_2$ is a crosslinking group having a hydroxyphenyl group,
wherein said outer layer comprises a polymer matrix formed of said fluoroelastomer, and wherein said polysilsesquioxane are covalently bonded to said polymer matrix via linkages formed from the hydroxyphenyl crosslinking group, and
wherein $R_2$ is a functional crosslinking group selected from the group consisting of the following:

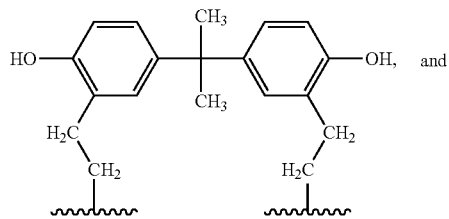

-continued

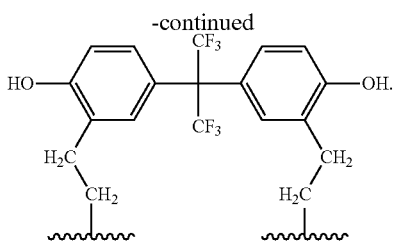

2. The fuser member in accordance with claim 1, wherein said polysilsesquioxane are polyhedral oligomeric silsesquioxanes.

3. The fuser member in accordance with claim 1, wherein $R_1$ is a fluorinated functional group.

4. The fuser member in accordance with claim 1, wherein said polysilsesquioxane further comprise a second compound having the following Formula I:

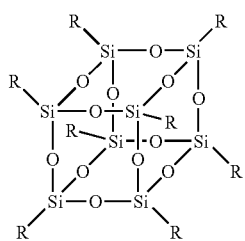

wherein R represents functional groups.

5. The fuser member in accordance with claim 1, wherein $R_1$ is selected from the group consisting of a fluorinated alkyl and a fluorinated aryl group.

6. The fuser member in accordance with claim 5, wherein $R_1$ is selected from the group consisting of the following:

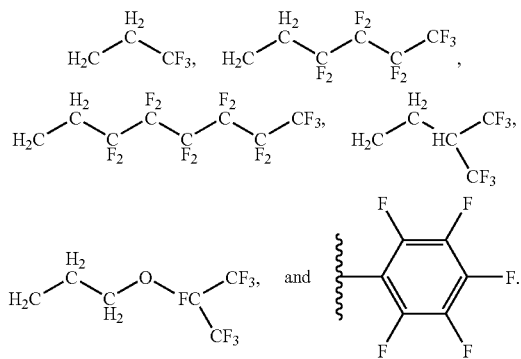

7. The fuser member in accordance with claim 1, wherein said polymer matrix comprises a crosslinked polymer.

8. The fuser member in accordance with claim 1, wherein said fluoroelastomer is a tetrapolymer comprising about 35 weight percent of vinylidenefluoride units, about 34 weight percent of hexafluoropropylene units, about 29 weight percent of tetrafluoroethylene units and about 2 weight percent cure site monomer units.

9. The fuser member of claim 1, wherein said polysilsesquioxane are nanoparticles having a particle size of from about 0.5 nm to about 5 nm.

10. The fuser member in accordance with claim 9, wherein said nanoparticles have a particle size of from about 1 nm to about 2 nm.

11. The fuser member in accordance with claim 1, wherein said fuser substrate is in the form of a metal roller.

12. A fuser member comprising a substrate, and thereover, an outer layer comprising a crosslinked polymer matrix comprising a fluoroelastomer having polyhedral oligomeric polysilsesquioxane dispersed and covalently bonded within said crosslinked polymer matrix,
    wherein said polysilsesquioxane are present in an amount ranging from about 0.1 percent to about 30 percent by weight of total solids of the outer layer,
    wherein said fluoroelastomer is selected from the group consisting of (1) a class of copolymers of two of vinylidenefluoride, hexafluoropropylene and tetrafluoroethylene, (2) a class of terpolymers of vinylidenefluoride, hexafluoropropylene and tetrafluoroethylene, and (3) a class of tetrapolymers of vinylidenefluoride, hexafluoropropylene, tetrafluoroethylene and a cure site monomer,
    wherein the polyhedral oligomeric polysilsesquioxane is fixed in the fluoroelastomer by reacting the polymer chains with a compound of Formula:

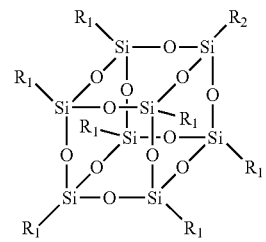

wherein $R_1$ is a functional group selected from the group consisting of substituted alkyl group having from about 1 to about 20 carbons, unsubstituted alkyl group having from about 1 to about 20 carbons, a substituted aryl group having from about 4 to about 10 carbons, an unsubstituted aryl group having from about 4 to about 10 carbons, a fluorinated alkyl group having from about 1 to about 20 carbons, and a fluorinated aryl group having from about 4 to about 10 carbons, and $R_2$ is a hydroxyphenyl crosslinking group, and
    wherein $R_2$ is a functional crosslinking group selected from the group consisting of the following:

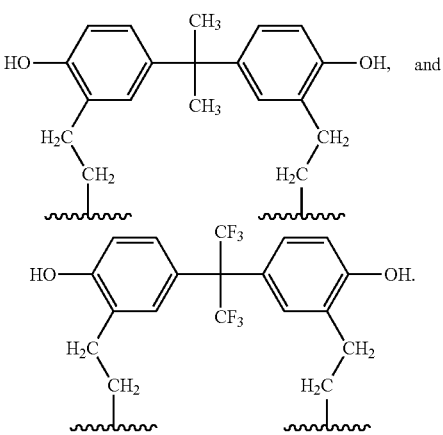

13. An image forming apparatus for forming images on a recording medium comprising:

a charge-retentive surface to receive an electrostatic latent image thereon;

a development component to apply toner to the charge-retentive surface to develop an electrostatic latent image to form a developed image on the charge-retentive surface;

a transfer component to transfer the developed image from the charge-retentive surface to a copy substrate; and a fuser member for fusing toner images to a surface of the copy substrate, wherein said fuser member comprises a substrate, and thereover, an outer layer comprising polysilsesquioxane present in an amount ranging from about 0.1 percent to about 30 percent by weight of total solids of the outer layer, wherein the outer layer further comprises a fluoroelastomer selected from the group consisting of (1) a class of copolymers of two of vinylidenefluoride, hexafluoropropylene and tetrafluoroethylene, (2) a class of terpolymers of vinylidenefluoride, hexafluoropropylene and tetrafluoroethylene, and (3) a class of tetrapolymers of vinylidenefluoride, hexafluoropropylene, tetrafluoroethylene and a cure site monomer;

wherein said polysilsesquioxane are fixed in the fluoroelastomer by reacting the polymer chains with a compound of Formula II:

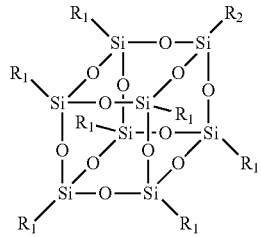

wherein $R_1$ is a functional group selected from the group consisting of substituted alkyl group having from about 1 to about 20 carbons; unsubstituted alkyl group having from about 1 to about 20 carbons; a substituted aryl group having from about 4 to about 10 carbons; an unsubstituted aryl group having from about 4 to about 10 carbons; a fluorinated alkyl group having from about 1 to about 20 carbons, and a fluorinated aryl group having from about 4 to about 10 carbons; and $R_2$ is a crosslinking group having a hydroxyphenyl group, wherein said outer layer comprises a polymer matrix formed of said fluoroelastomer, and wherein said polysilsesquioxane are covalently bonded to said polymer matrix via linkages formed from the hydroxyphenyl crosslinking group, and wherein $R_2$ is a functional crosslinking group selected from the group consisting of the following:

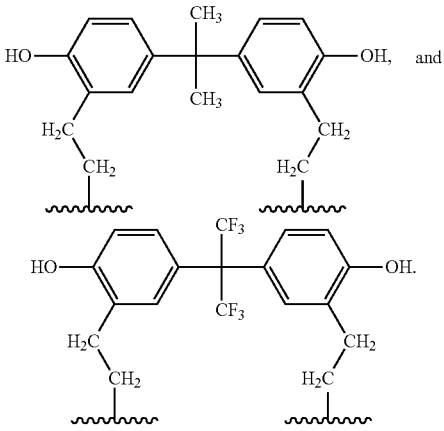

* * * * *